United States Patent Office
3,332,000
Patented July 18, 1967

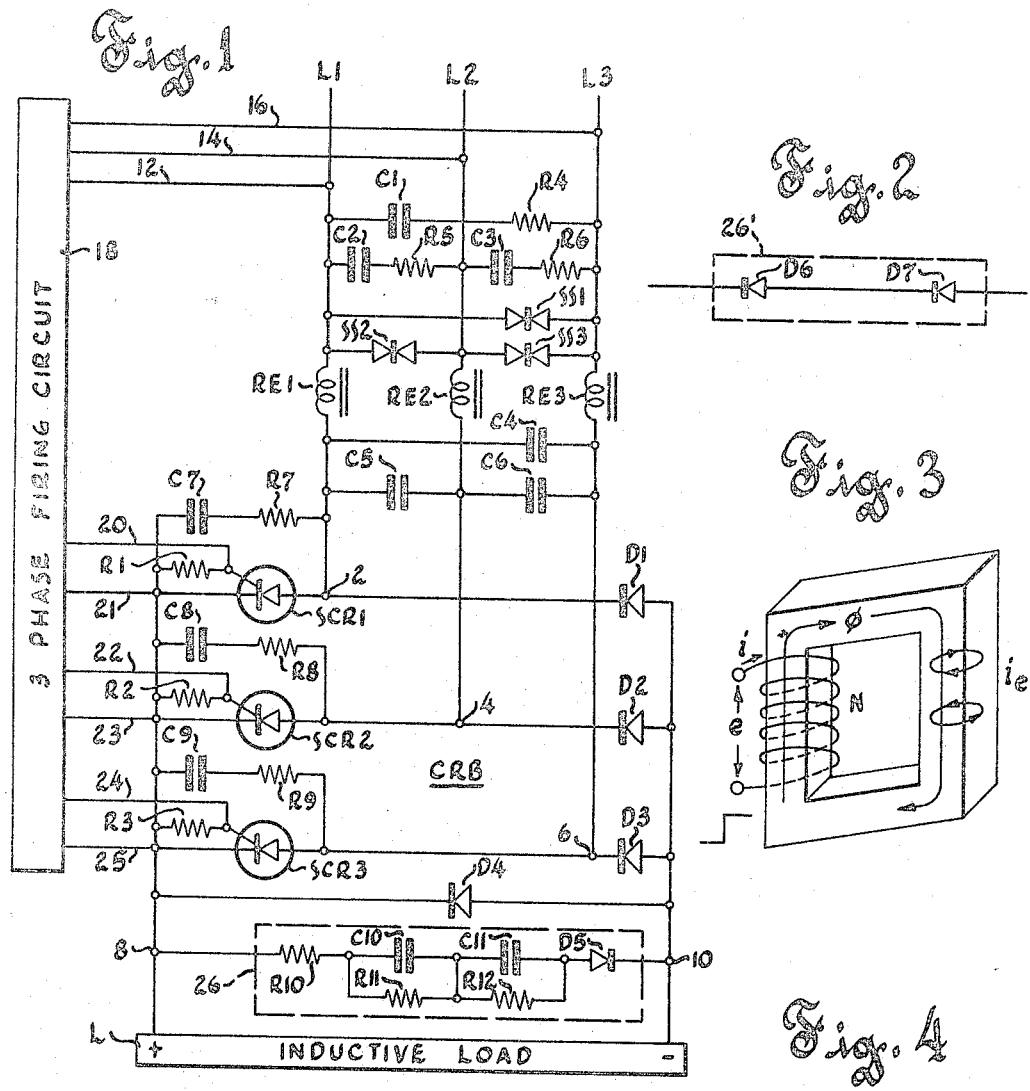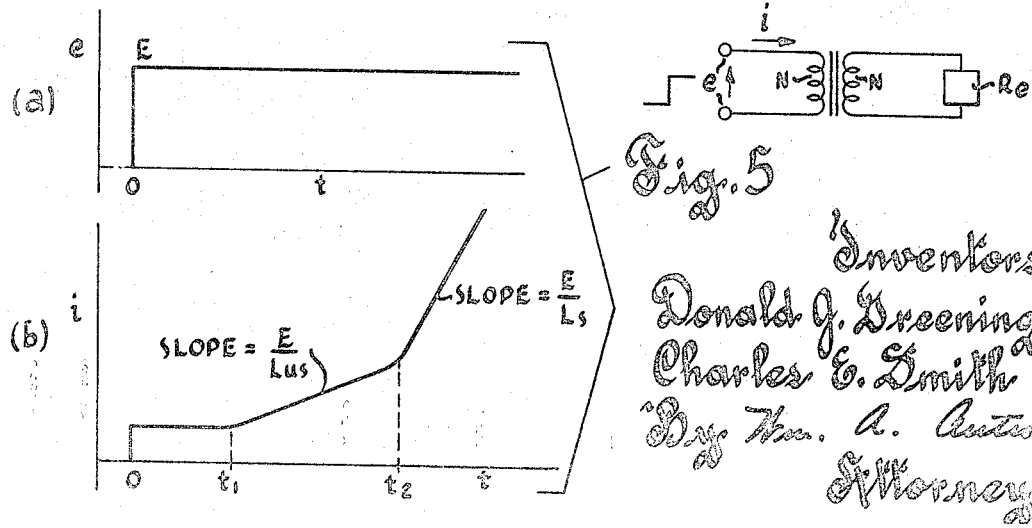

3,332,000
PROTECTIVE MEANS FOR SOLID STATE DEVICES
Donald J. Greening, Thiensville, and Charles E. Smith, Wauwatosa, Wis., assignors to Cutler-Hammer, Inc., Milwaukee, Wis., a corporation of Delaware
Filed Dec. 22, 1964, Ser. No. 420,332
10 Claims. (Cl. 318—345)

This invention relates to protective means for solid state devices and more particularly to protective means for controlled rectifiers and commutating diodes in direct current adjustable voltage power supply systems.

While not limited thereto, the invention is especially applicable to three-phase solid state controlled rectifier bridge circuits adapted to supply inductive loads such as direct current motors.

An object of the invention is to provide improved protective means for solid state power controlling devices of the high voltage type.

A more specific object of the invention is to provide an improved plural-phase solid state controlled rectifier bridge circuit.

Another specific object of the invention is to provide an improved combination of protective devices for a three-phase solid state controlled rectifier bridge supplying adjustable voltage to a direct current motor.

Other objects and advantages of the invention will hereinafter appear.

These and other objects and advantages of the invention and the manner of obtaining them will best be understood by reference to the following specification taken in conjunction with the accompanying drawing, wherein:

FIGURE 1 is a circuit diagram of a controlled rectifier bridge and protective means for the solid state devices therein according to the invention;

FIG. 2 is a modification of a portion of the circuit of FIG. 1;

FIG. 3 is a schematic illustration of a line reactor used in the circuit of FIG. 1;

FIG. 4 is an electrical equivalent circuit for the reactor of FIG. 3; and

FIGS. 5a and 5b are graphical illustrations of operating characteristics of the circuit of FIGS. 1 and 3.

Referring to FIG. 1, there is shown an embodiment of the invention comprising a controlled rectifier bridge supplied from a three-phase source and having protective means incorporated therein for the solid state devices. Supply lines L1, L2 and L3 which are connectable to a three-phase alternating current power source are connected through line reactors RE1, RE2 and RE3 to the respective input terminals 2, 4 and 6 of a three-phase controlled rectifier bridge CRB. The positive and negative output terminals 8 and 10, respectively, of the bridge are connected to an inductive load L such as the armature winding of a shunt wound direct current motor. Supply lines L1, L2 and L3 are also connected through conductors 12, 14 and 16, respectively, to a three-phase firing circuit 18.

Controlled rectifier bridge CRB is of the solid state type and comprises three silicon controlled rectifiers SCR1, SCR2 and SCR3 and three power diodes D1, D2 and D3. Bridge input terminals 2, 4 and 6 are connected to the anodes of silicon controlled rectifiers SCR1, SCR2 and SCR3, respectively, and the cathodes thereof are connected to one another and in common to positive output terminal 8. Negative output terminal 10 of the bridge is connected to the anodes of solid state diodes D1, D2 and D3 and the cathodes of the latter are connected to input terminals 2, 4 and 6, respecively. A current shunting resistor R1 is connected between the gate and cathode of SCR1. In like manner, a resistor R2 is connected between the gate and cathode of SCR2 and a resistor R3 is connected between the gate and cathode of SCR3. Conductors 20 and 21 connect a first pulse output of three-phase firing circuit 18 across the gate and cathode of SCR1. In like manner, conductors 22 and 23 connect a second pulse output of the firing circuit across the gate and cathode of SCR2, and conductors 24 and 25 connect a third pulse output of the firing circuit across the gate and cathode of SCR3.

Three-phase firing circuit 18 has been shown as a rectangle to avoid complicating the drawing since firing circuits suitable for use with this controlled rectifier bridge are known. For a detailed description and illustration of such firing circuit, reference may be had to R. W. Spink copending application Ser. No. 248,314, filed Dec. 31, 1962, now Patent 3,281,645 dated Oct. 25, 1966, and assigned to the assignee of this invention.

A commutating diode D4 is connected across the output terminals of the bridge and is poled so that it blocks current flow in the direction from the positive to the negative output terminal and allows current flow in its forward, low impedance direction from negative terminal 10 to positive terminal 8 whenever the induced voltage of the inductive load exceeds the bridge output voltage.

The aforementioned protective means for the solid state devices comprises a resistance-capacitance circuit connected across each phase of the source, a surge suppressor connected across each phase of the source, the aforementioned reactors in series in the respective input lines, capacitors connected across the input terminals of the bridge and a resistance-capacitance circuit connected across each silicon controlled rectifier. The protective means for the commutating diode comprises a resistance-capacitance-diode circuit connected thereacross.

More specifically, such protective means includes a resistor R4 and a capacitor C1 connected in series across supply lines L1 and L3, a resistor R5 and a capacitor C2 connected in series across supply lines L1 and L2, and a resistor R6 and a capacitor C3 connected in series across supply lines L2 and L3. Surge suppressors SS1, SS2 and SS3 are connected across supply lines L1 and L3, L1 and L2, and L2 and L3, respectively. Reactors RE1, RE2 and RE3 are connected between the surge suppressors and the respective input terminals 2, 4 and 6 in series in the respective input conductors. A capacitor C4 is connected across input terminals 2 and 6, a capacitor C5 is connected across input terminals 2 and 4, and a capacitor C6 is connected across input terminals 4 and 6. A resistor R7 and a capacitor C7 are connected in series across the anode and cathode of SCR1. In a similar manner, a resistor R8 and a capacitor C8 are connected in series across the anode and cathode of SCR2, and a resistor R9 and a capacitor C9 are connected in series across the anode and cathode of SCR3. A circuit 26 comprising a resistor R10, capacitors C10 and C11 and a diode D5 are connected in series across commutating diode D4 from positive output terminal 8 to negative output terminal 10, diode D5 being in its forward, low impedance direction and there being a resistor R11 connected across capacitor C10 and a resistor R12 connected across capacitor C11.

Three-phase firing circuit 18 supplies firing pulses to the gates of the three silicon controlled rectifiers SCR1, SCR2 and SCR3 during positive anode voltage periods thereof to cause current flow to load L. For example, when the line L1 voltage is positive relative to line L2 and a firing pulse is applied to the gate of SCR1, current flows from line L1 through reactor RE1, input terminal 2, SCR1, output terminal 8, load L, output terminal 10, diode D2, input terminal 4 and reactor RE2 to line L2. In a similar manner, current flows from each line to each other line when the associated silicon controlled rectifier is fired at a point during its positive anode voltage period. The phase of the firing pulse is selectively adjustable so that the silicon controlled rectifiers can be fired earlier or later in their positive anode voltage periods thereby to adjust the amount of the direct voltage supplied to the load. After each silicon controlled rectifier is fired, it will continue to conduct for the remainder of its positive anode voltage half-cycle although the firing pulse terminates. Thus, the firing phase determines the amount of conduction and consequently the magnitude of the voltage applied to the load. Diode D4 conducts current in response to the induced voltage of the inductive load and dissipates such induced voltage. This allows the anode voltage of the silicon controlled rectifiers to go to zero thereby to cause them to stop conducting at the end of the positive anode voltage half-cycles.

The solid state devices in FIG. 1 must be protected against certain electrical excesses which occur when high voltages are involved. These electrical excesses or unwanted transients which must be protected against include the following:

(1) High voltage silicon controlled rectifiers, that is, SCR's having PRV (peak reverse voltage) ratings from 500 volts to 1200 volts, required for 480 volt D.C. drives have a much lower $di/dt$ (rate of change of current) rating than low voltage silicon controlled rectifiers, that is, SCR's having PRV ratings from 25 volts to 500 volts. The rate of rise of current (actually the current density) in the SCR must be controlled during the turn-on period in order to prevent destruction of the SCR.

(2) High voltage SCR's have a much lower $dv/dt$ (rate of change of voltage) rating than low voltage SCR's. The rate of rise of application of forward anode to cathode voltage to the SCR must be controlled below a predetermined rate in order to prevent accidental firing of the SCR.

(3) Lightning and switching transients on the A.C. power lines cause high rates of rise of line voltage and high magnitudes of line voltage which can accidentally fire the SCR.

(4) The maximum voltage applied to an SCR in either the forward or reverse direction must be limited to a value less than the PRV rating of the device. Excessive forward voltage will accidentally fire the SCR. Excessive reverse voltage can cause failure of the SCR or break it down (avalanche current flow) and trip the protective circuit breaker or fuse.

(5) The recovery time of power diodes when subjected to sudden reverse voltage allows reverse current to flow through the diode. This current is suddenly interrupted by the diode. The sudden rate of change of current, in conjunction with circuit inductance, produces a voltage transient with a high rate of rise which can accidentally fire an SCR or destroy a diode.

(6) Surge current transients may enter the controlled bridge from the A.C. lines. These current transients are caused by interrupting large currents in branch circuits in the A.C. power system.

The protective devices shown in FIG. 1 function in conjunction with one another as hereinafter described to overcome the above undesirable electrical effects.

Capacitors C1, C2 and C3 provide a storage sink for line current surges which may enter the circuit at lines L1, L2 and L3.

Resistors R4, R5 and R6 provide damping for capacitors C1, C2 and C3 which tend to oscillate with the system and motor (load) inductance after the silicon controlled rectifiers in the bridge are gated.

Surge suppressors SS1, SS2 and SS3 are selenium rectifier stacks arranged to avalanche at a predetermined voltage level of either polarity. They clip the excessive line voltage transients which enter supply lines L1, L2 and L3.

Reactors RE1, RE2 and RE3 limit the current to the silicon controlled rectifiers for a finite time after the latter are gated in order to allow sufficient turn-on times and prevent destruction of the SCR's due to excessive current density as hreinafter more fully described in connection with FIGS. 3–5.

Capacitors C4, C5 and C6 provide a path for the recovery currents of power diodes D1, D2 and D3 and, therefore, prevent an excessive rate of rise of forward voltage from being applied to SCR1, SCR2 and SCR3. An excessive rate of rise of forward voltage on the SCR can cause accidental gating thereof into conduction.

Capacitors C7, C8 and C9 also provide a low impedance path for the recovery currents of power diodes D1, D2 and D3 and, therefore, prevent accidental gating of the SCR's due to excessive rate of rise of forward voltage. These capacitors also provide the SCR's with sufficient holding current immediately after gating the SCR into conduction and before the line current through reactors RE1, RE2 and RE3 has reached the minimum holding current level.

Resistors R7, R8 and R9 limit the discharge current of capacitors C7, C8 and C9 immediately after the SCR's are gated into conduction to prevent excessive current density in the SCR during the turn-on interval.

Circuit 26 which is connected across commutating diode D4 provides a low impedance path for the recovery current of commutating diode D4 and thereby limits the reverse transient voltage developed across the commutating diode during the recovery interval. In this circuit 26, diode D5 permits capacitors C10 and C11 to be charged to the peak voltage applied to the inductive load terminals. Resistors R11 and R12 provide discharge paths for capacitors C10 and C11, respectively, so that the total capacitor voltage can follow the peak inductive load voltage for both decreasing and increasing amplitudes. Resistor R10 provides a low impedance, non-inductive path for the recovery current of commutating diode D4 after the circuit inductance has caused the load terminal voltage to exceed the total voltage on capacitors C10 and C11.

The aforementioned commutating diode recovery transient protective circuitry is a spill-over circuit which exhibits a high impedance until the amplitude of the voltage applied to its terminals exceeds the voltage on capacitors C10 and C11. When the input voltage exceeds the capacitor voltage, the circuit impedance abruptly changes to the resistance value of resistor R10.

A commutating diode recovery transient protective circuit which performs in a similar manner to the circuit described above but which utilizes fewer components and is more economical is shown in FIG. 2. As will be apparent, circuit 26' in FIG. 2 could be substituted in place of circuit 26 in FIG. 1. This circuit consists of two avalanche diodes D6 and D7 connected in series with one another in their forward, low impedance direction from terminal 10 to terminal 8 so that they present a high impedance to the bridge output. The reverse avalanche voltage of these diodes is selected so that the total reverse avalanche voltage of the two diodes in series is less than the reverse voltage rating of commutating diode D4. Diodes D6 and D7 exhibit a high impedance to reverse voltage during the commutating diode recovery period until the circuit inductance forces the voltage amplitude to the avalanche level. At this point, diodes D6 and D7 break down in the reverse direction and limit the load terminal voltage to the combined avalanche voltage of the two. This protects the commutating diode from excessive reverse voltage. Two avalanche diodes D6 and D7 are connected in series in order to insure that the commutating diode carries almost the entire forward commutating current and to divide the reverse recovery power dissipation between two diodes thereby permitting the use of smaller avalanche diodes.

Reactors RE1, RE2 and RE3 are saturating reactors constructed to absorb the entire line voltage for a finite length of time of about 30 micro-seconds, for example, after the SCR's are gated into conduction. After this finite length of time, the reactors saturate and thus become a negligible series line impedance. This finite length of time permits the SCR to become fully transformed to the conducting state before appreciable line current is permitted to flow.

A unique feature of the line reactor design is the type of impedance it presents to the line current before it becomes saturated. The line reactor has been designed and constructed to present a purely resistive impedance to the line current for a finite length of time by capitalizing on the effects of eddy currents in iron cores.

For this purpose, consideration may be given to the reactor shown in FIG. 3 which consists of N turns of a conductor around an iron core. If a step voltage is applied to the winding at time equals zero, the build-up of flux $\phi$ in the iron core will be opposed by the field associated with eddy currents $i_e$ which are induced in the iron core. The total effect of the eddy current reaction is a function of the type of material used for the core and the thickness of the core laminations. The thinner the laminations, the smaller are the eddy currents.

The effect of the eddy currents in the iron core presents the same transient impedance at the terminals of the reactor as that of a 1 to 1 ratio-wound transformer loaded with a resistor Re on its secondary as shown in FIG. 4. When a step voltage is applied to the primary terminals of the transformer as shown in FIGS. 4 and 5a, the initial impedance appears as resistor Re and thus constant current flows in the primary for a time indicated as 0 to $t_1$ in FIG. 5b. At the end of this time, the impedance appears as the unsaturated inductance Lus of the primary and the current increases linearly with time until saturation occurs in the iron at time $t_2$. After this time as shown in FIG. 5b, the impedance appears as the saturated inductance Ls of the primary and the current increases linearly at a faster rate.

As mentioned hereinbefore, the effective value of eddy current resistance Re is controlled by the type of core material, the thickness of the laminations and the number of turns on the coil. Reactors RE1, RE2 and RE3 in the transient protective circuit of FIG. 1 have been designed and arranged to have an equivalent eddy current resistance Re which limits the current in the SCR's of the bridge circuit during the turn-on interval to a value compatible with the turn-on current density rating of the SCR. The reactor is designed to saturate after a time interval longer than the turn-on time of the SCR.

Although the functions of the various individual components of the protective circuitry have been described, the selection of the proper values of components cannot be accomplished on an individual sub-circuit basis. Since energy storage components such as capacitors and reactors are used, the interchange of energy from one part of the circuit to another has been studied with care. In other words, the entire protective circuit has been designed as a whole system rather than as a combination of sub-systems.

While the system hereinbefore described is effectively adapted to fulfill the objects stated, it is to be understood that we do not intend to confine our invention to the particular preferred embodiment of protective means disclosed, inasmuch as it is susceptible of various modifications without departing from the scope of the appended claims.

We claim:

1. In a plural-phase solid state controlled rectifier bridge circuit energized from a plural-phase alternating current power source and having a commutating diode across its output and arranged to control energization of an inductive direct current load device, the improvement comprising:

means for protecting the solid state devices of the bridge circuit and diode from deleterious electrical effects and comprising in combination:

resistor-capacitor means connected to said source;
surge suppressor means connected to said source;
reactor means connecting the input terminals of the bridge circuit to the aforementioned surge suppressor means and resistor-capacitor means;
capacitor means connected to the input terminals of said bridge circuit;
resistor-capacitor means connected across the solid state controlled rectifiers in said bridge circuit;
and resistor-capacitor and unidirectional conducting means connected across said commutating diode.

2. The invention defined in claim 1, wherein said resistor-capacitor means connected to said source comprises:

a resistor and a capacitor connected in series across each phase of said plural-phase source.

3. The invention defined in claim 1, wherein said surge suppressor means connected to said source comprises:

a surge suppressor consisting of a selenium rectifier stack arranged to avalanche at a predetermined voltage level of either polarity connected across each phase of said plural-phase source.

4. The invention defined in claim 1, wherein said reactor means comprises:

a reactor having a magnetic core and a coil connected in each power supply line at the input terminal of said bridge circuit for limiting the current to a safe value for a time interval after gating of the associated controlled rectifier to allow full turn-on of the latter at such limited current.

5. The invention defined in claim 1, wherein said capacitor means comprises:

a capacitor connected across each pair of input terminals of the bridge circuit.

6. The invention defined in claim 1, wherein said resistor-capacitor means connected across the solid state controlled rectifier comprises:

a resistor and a capacitor connected in series across the anode-cathode circuit of each controlled rectifier in said bridge circuit.

7. The invention defined in claim 1, wherein said resistor-capacitor and unidirectional conducting means comprises:

a resistor and a capacitor and a unidirectional conducting diode connected in series across said commutating diode;
and a resistor connected across said capacitor.

8. In combination with a three-phase solid state controlled rectifier bridge circuit having a controlled rectifier and a power diode for each phase and energized from a three-phase alternating current source and having a commutating diode connected across the direct current output thereof for supplying the armature winding of a direct current motor:

means for protecting the solid state devices of the bridge circuit and the commutating diode from harmful electrical effects comprising:

a resistor and a capacitor connected across each phase of the three-phase source for providing a damped storage sink for line current surges;
a surge suppressor connected across each phase of the three-phase source for clipping excessive line voltage transients;
a reactor connected in each power line between the aforementioned elements and the input terminals of said bridge circuit for limiting the currents to the solid state controlled rectifiers for finite time intervals after they are gated to allow sufficient turn-on time at low current;
a capacitor connected across each pair of input terminals of said bridge circuit for providing paths for the recovery currents of said power diodes;

a resistor and a capacitor connected across each controlled rectifier of the bridge circuit to provide low impedance paths for the recovery currents of the power diodes and to provide the associated controlled rectifiers with sufficient holding current immediately after gating thereof, said resistor limiting the discharge current of the associated capacitor immediately after the corresponding controlled rectifier is gated; and a resistor and capacitor and unidirectional diode connected in series across said commutating diode to provide a spillover circuit which exhibits a high impedance until the amplitude of the voltage applied to its terminals exceeds the voltage of the capacitor therein whereupon its impedance abruptly decreases to the value of the resistor therein; and a resistor connected across the capacitor in said spillover circuit to provide a discharge path for such capacitor so that the capacitor voltage can follow the peak motor armature voltage.

9. The invention defined in claim 8, wherein: said resistor and capacitor connected across each phase are connected in series with one another.

10. The invention defined in claim 8, wherein: said resistor and capacitor connected across each controlled rectifier are connected in series with one another.

No references cited.

JOHN F. COUCH, *Primary Examiner.*

W. H. BEHA, JR., *Assistant Examiner.*